United States Patent
Sekiya et al.

(10) Patent No.: US 10,589,789 B2
(45) Date of Patent: Mar. 17, 2020

(54) VEHICLE BODY FRONT PART STRUCTURE

(71) Applicant: HONDA MOTOR CO., LTD., Tokyo (JP)

(72) Inventors: Takayuki Sekiya, Wako (JP); Akira Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 16/018,699

(22) Filed: Jun. 26, 2018

(65) Prior Publication Data

US 2018/0370571 A1 Dec. 27, 2018

(30) Foreign Application Priority Data

Jun. 27, 2017 (JP) ................................. 2017-125262

(51) Int. Cl.
| | |
|---|---|
| *B62D 21/15* | (2006.01) |
| *B62D 27/02* | (2006.01) |
| *B60R 19/34* | (2006.01) |
| *B62D 21/02* | (2006.01) |
| *B62D 25/08* | (2006.01) |

(52) U.S. Cl.
CPC ............ *B62D 21/152* (2013.01); *B60R 19/34* (2013.01); *B62D 21/02* (2013.01); *B62D 25/082* (2013.01); *B62D 27/02* (2013.01)

(58) Field of Classification Search
CPC ...... B62D 21/152; B62D 27/02; B62D 21/02; B60R 19/34
USPC .................................................. 296/187.09
See application file for complete search history.

(56) References Cited

U.S. PATENT DOCUMENTS

| | | | |
|---|---|---|---|
| 9,126,633 B2 * | 9/2015 | Cho ..................... | B62D 25/082 |
| 9,174,520 B2 * | 11/2015 | Katayama ............... | B60L 50/51 |
| 9,242,675 B2 * | 1/2016 | Kuriyama ............ | B62D 25/082 |
| 9,539,968 B2 | 1/2017 | Nishida et al. | |
| 9,676,417 B2 * | 6/2017 | Yamada .................. | B60R 19/24 |
| 2014/0238765 A1 * | 8/2014 | Tomokage ............... | B60K 1/00 |
| | | | 180/232 |

(Continued)

FOREIGN PATENT DOCUMENTS

| | | |
|---|---|---|
| JP | 2016-002955 A | 1/2016 |
| JP | 2016-078710 A | 5/2016 |

(Continued)

OTHER PUBLICATIONS

Japanese Office Action with English translation dated Dec. 11, 2018, 10 pages.

*Primary Examiner* — Pinel E Romain
(74) *Attorney, Agent, or Firm* — Rankin, Hill & Clark LLP (57) ABSTRACT

A vehicle body front part structure includes: a pair of right and left front side frames each extending in a vehicle front-rear direction; a pair of right and left upper members each extending in the vehicle front-rear direction at respective outer sides in a vehicle width direction of the pair of right and left front side frames; and a pair of right and left lower members each located at a vehicle front side of each of the upper members and each allowing a vehicle front side end part thereof to be coupled to each of the front side frames. In the vehicle body front part structure, each of the lower members is composed of a pipe member, and the vehicle front side end part of each of the lower members linearly extends in an up-down direction.

3 Claims, 6 Drawing Sheets

(56) References Cited

U.S. PATENT DOCUMENTS

| | | | |
|---|---|---|---|
| 2014/0239671 A1* | 8/2014 | Mori | B62D 21/152 |
| | | | 296/187.09 |
| 2016/0107696 A1 | 4/2016 | Suzumori | |
| 2016/0121934 A1* | 5/2016 | Murayama | B62D 21/152 |
| | | | 296/187.09 |
| 2017/0113727 A1 | 4/2017 | Nakamoto et al. | |

FOREIGN PATENT DOCUMENTS

| | | |
|---|---|---|
| JP | 5949956 B2 | 7/2016 |
| JP | 2017-081280 A | 5/2017 |

\* cited by examiner

VEHICLE BODY FRONT PART STRUCTURE

CROSS-REFERENCE TO RELATED APPLICATION

This application is based upon and claims priority from the Japanese Patent Application No. 2017-125262, filed on Jun. 27, 2017, the entire contents of which are incorporated herein by reference.

BACKGROUND OF THE INVENTION

1. Field of the Invention

The present invention relates to a vehicle body front part structure of a vehicle such as an automobile.

2. Description of the Related Art

For example, Patent document 1 (Japanese Patent No. 5949956) discloses a vehicle body front part structure (see FIG. 3) provided with a coupling mechanism adapted to couple a front end of an upper member with a front end of a front side member. The upper member is composed of a pipe member, and a rear end part thereof is coupled via a rear flange to an apron upper member.

A front end part of the upper member (pipe member) is disposed to extend nearly linearly in the inner and oblique direction as going toward the vehicle front side in planar view, and coupled via a front side joining part with an outer side in the vehicle width direction of the front side frame.

However, the vehicle body front part structure disclosed in Patent document 1 allows the tip of the pipe member to be directed toward the vehicle front side, thus causing a risk that the vehicle front part increases in dimension by a pipe fixing part that fixes the tip of the pipe member, thereby inhibiting downsizing of the vehicle.

Moreover, in a case where the vehicle body front part structure is configured to allow the pipe member to be deformed when a collision load is input from the front side of the vehicle, and to allow the deformed pipe member to abut on the tire for transmission of the collision load, there is a risk that the deformed pipe member does not abut on the tire by being displaced above the tire.

The present invention has therefore been made in view of the above problem, and an object of the invention is to provide a vehicle body front part structure capable of promoting downsizing of a vehicle and transmitting a collision load input from the front side of the vehicle, to a tire.

SUMMARY OF THE INVENTION

In order to solve the above problem, according to an aspect of the present invention, a vehicle body front part structure reflecting one aspect of the present invention includes: a pair of right and left front side frames each extending in a vehicle front-rear direction; a pair of right and left upper members each extending in the vehicle front-rear direction at respective outer sides in a vehicle width direction of the pair of right and left front side frames; and a pair of right and left lower members each located at a vehicle front side of each of the upper members and each allowing a vehicle front side end part thereof to be coupled to each of the front side frames, wherein each of the lower members is composed of a pipe member, and the vehicle front side end part of each of the lower members extends in an up-down direction.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

FIG. 3 is a schematic perspective view showing a left lower member, a left front side frame and the like.

FIG. 4 is a side view showing the left lower member, the left front side frame and the like.

DETAILED DESCRIPTION OF THE PREFERRED EMBODIMENTS

Hereinafter, one or more embodiments of the present invention will be described in detail with reference to the drawings as necessary.

Note that in each figure, "front-rear", "right-left", and "up-down" indicate a vehicle front-rear direction, a vehicle width direction (right-left direction), and a vertical and up-down direction, respectively.

The vehicle to which a vehicle body front part structure according to an embodiment of the present invention is applied includes a vehicle body composed of a monocoque body. The vehicle body is disposed symmetrically to a center line (not shown) that passes through the center in the vehicle width direction of the vehicle to extend along the vehicle front-rear direction.

Figure 1:
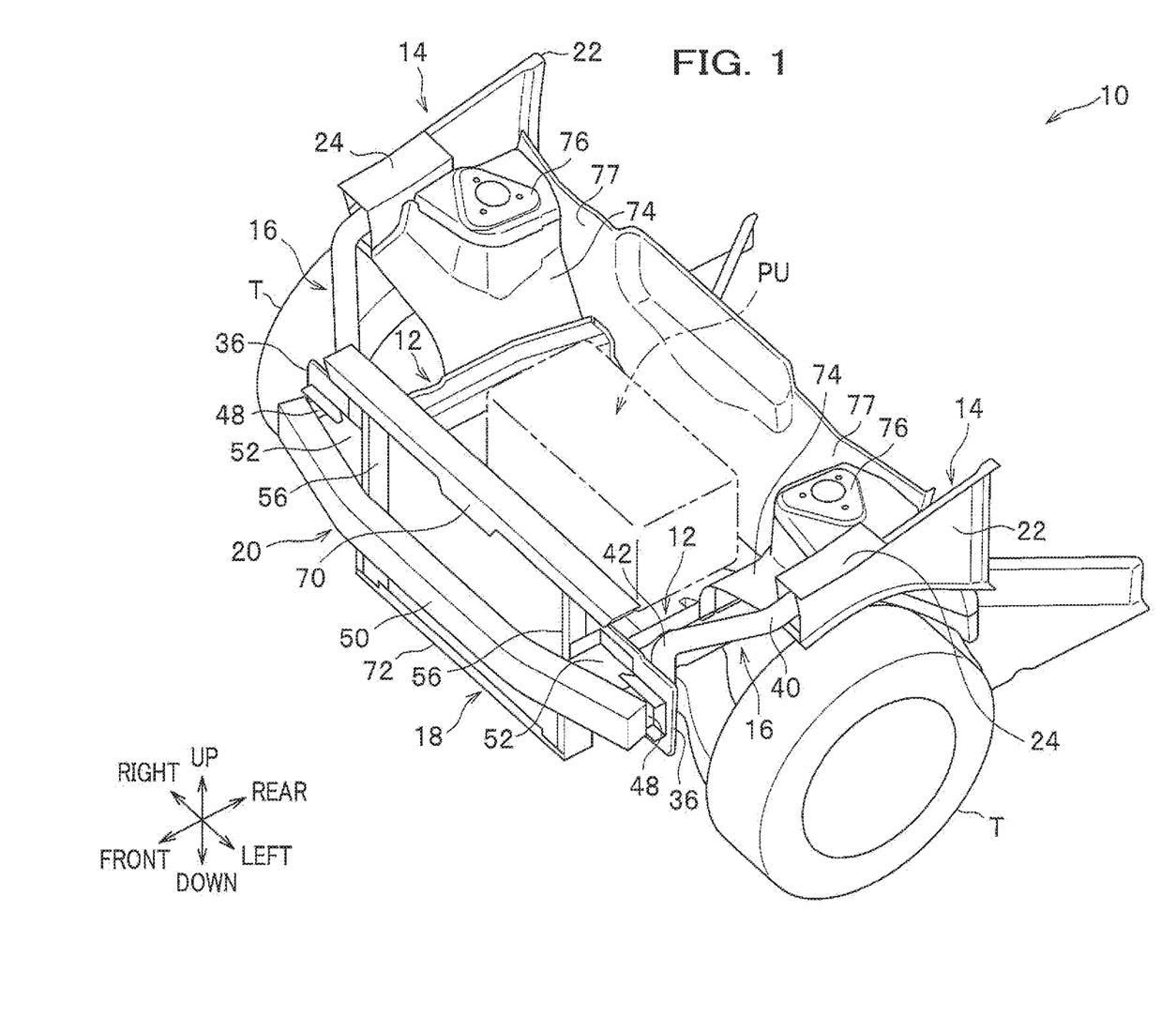
FIG. 1 is a schematic perspective view showing a vehicle front part of a vehicle to which a vehicle body front part structure according to an embodiment of the present invention is applied.
Figure 2:
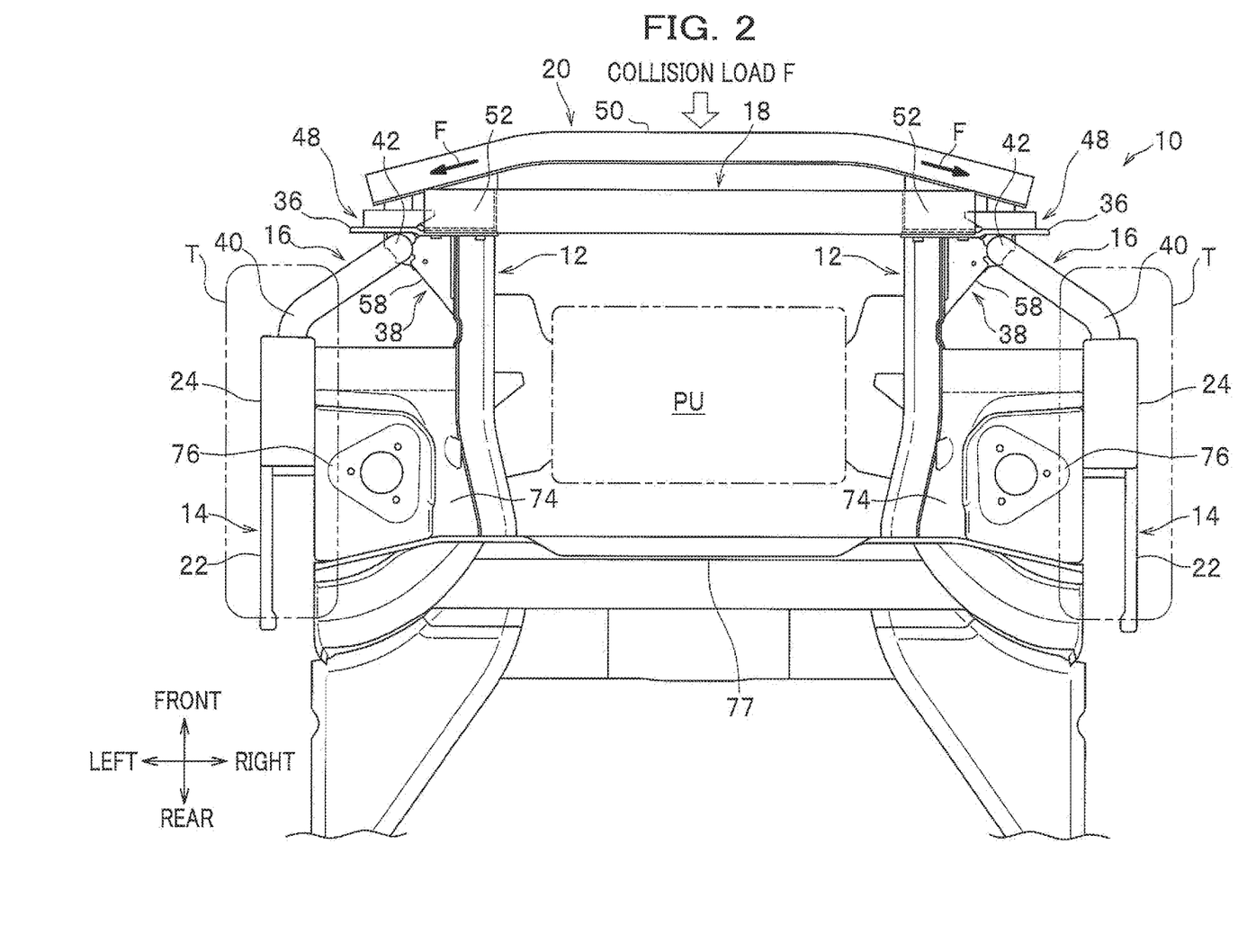
FIG. 2 is a plan view showing the vehicle front part shown in FIG. 1.

As shown in FIG. 1 and FIG. 2, a vehicle body front part 10 is configured to include a pair of right and left front side frames 12, 12, a pair of right and left upper members 14, 14, a pair of right and left lower members 16, 16, a front bulk head 18, and a front bumper mechanism 20.

As shown in FIG. 1, the pair of right and left front side frames 12, 12 are disposed at both of right and left sides along the vehicle width direction and extend in the vehicle front-rear direction. A vehicle rear side end part of each of the front side frames 12 is coupled to a cross member (not shown). Note that in FIG. 1, reference sign "PU" denotes a power unit including rotary driving sources such as a motor and an engine, a gearbox (transmission) and the like, which are configured integrally with each other.

Moreover, each of the front side frames 12 is provided with an inner side frame 12a and an outer side frame 12b (see FIG. 3), and composed of a hollow member of a rectangular cross section having a space part 12c inside. The inner side frame 12a is disposed at the inner side in the vehicle width direction and formed to have a hat-shaped cross section. The outer side frame 12b is disposed at the outer side in the vehicle width direction and formed into a nearly flat plate shape. Further, a vehicle front side end part of the outer side frame 12b is formed so as to swell outward as going toward a tip thereof (see FIG. 6). A joining flange part of the inner side frame 12a and a joining flange part of the outer side frame 12b are integrally joined to each other to form a closed cross section.

The pair of right and left upper members 14, 14 are disposed at respective outer sides in the vehicle width direction of the pair of right and left front side frames 12, 12 and extend in the vehicle front-rear direction. A vehicle rear side end part of each of the upper members 14 is coupled to a corresponding one of a pair of right and left front pillars (not shown). Disposed below each of the upper members 14 is a tire T that composes a corresponding one of right and left front wheels.

Each of the upper members 14 has an upper member body 22, and an upper inner member 24 attached to the upper member body 22. The upper member body 22 is composed of a flat plate-shaped member that extends in the vehicle front-rear direction, and configured to become wider in the up-down direction as going toward the vehicle rear side from the vehicle front side in side view.

The upper inner member 24 is disposed at the inner side in the vehicle width direction at the vehicle front side of the upper member body 22. The upper inner member 24 is formed into a nearly channel shape in cross section, and composed of an upper wall 24a, a side wall 24b, and a lower wall 24c (see FIG. 3). The upper wall 24a and the lower wall 24c are disposed to face each other via the side wall 24b located between them, and joined to an upper end part and a lower end part on the vehicle front side of the upper member body 22, respectively.

Figure 3:
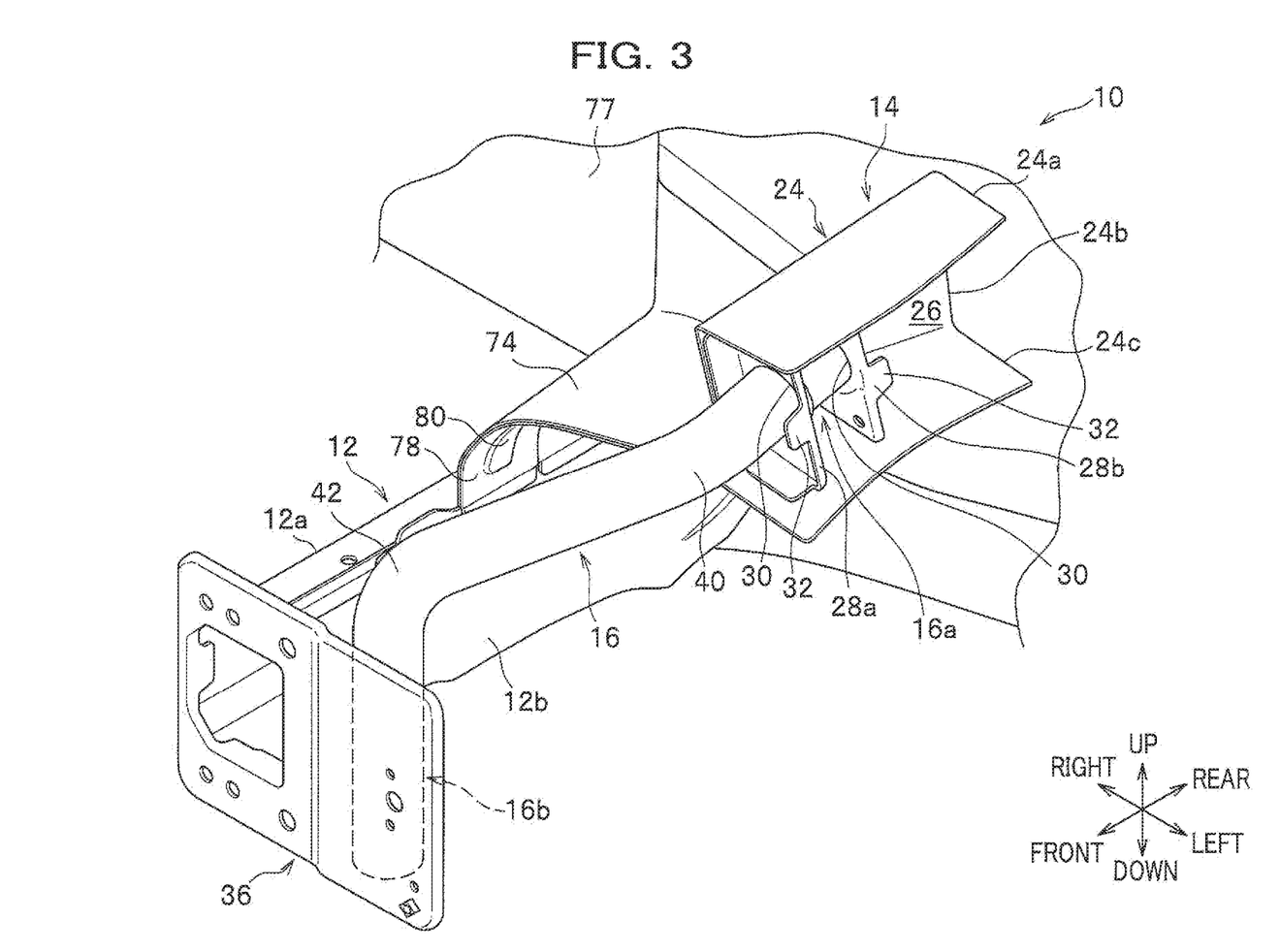

As shown in FIG. 3, a space part 26 is formed by an inner surface of the upper inner member 24 and an outer surface of the upper member body 22. Disposed in the space part 26 is a pair of bulkhead mounting metal fittings (first bulkheads) 28a, 28b each for fixing a vehicle rear side end part 16a of each of the lower members 16, spaced apart from each other by a predetermined space in the vehicle front-rear direction. Each of the bulkhead mounting metal fittings 28a (28b) includes a circular holding hole 30a that is adapted to hold the vehicle rear side end part 16a of the corresponding one of the lower members 16, and a flange part 32 that is joined to the inner surface of the upper inner member 24 and the outer surface of the upper member body 22, respectively.

Figure 4:
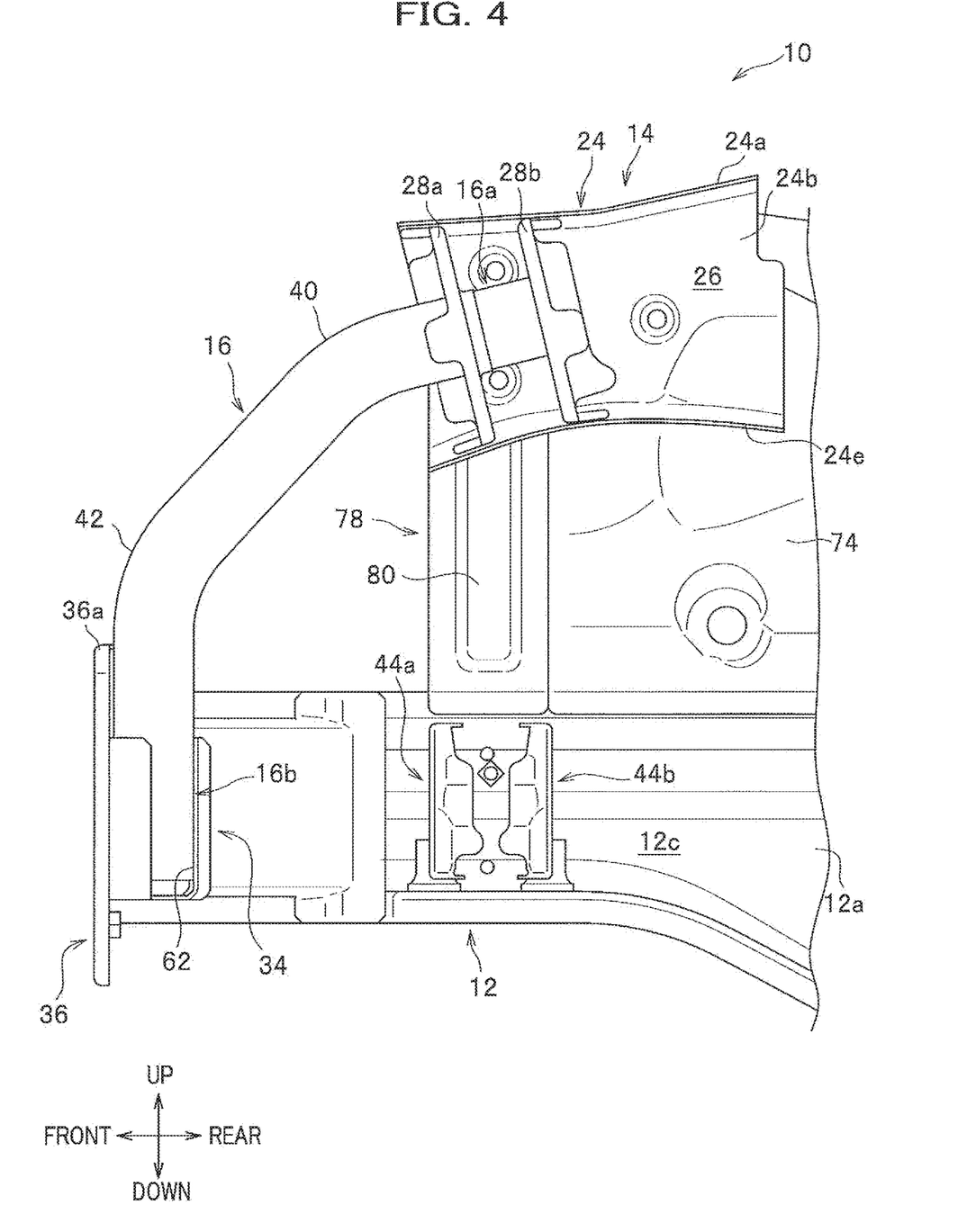

Each of the lower members 16 includes a first bent section 40 and a second bent section 42. As shown in FIG. 2 and FIG. 4, the first bent section 40 is formed to be bent inward in the vehicle width direction and downward from the vehicle rear side end part 16a fixed to the corresponding one of the upper members 14. As shown in FIG. 3, the second bent section 42 is formed to be located nearer the vehicle front side than the first bent section 40 and to be bent downward.

Each of the lower members 16 is formed nearly linearly in a part thereof from the vehicle rear side end part 16a to the first bent section 40. Each of the lower members 16 is formed nearly linearly in a part thereof from a vehicle front side end part 16b to the second bent section 42. The vehicle front side end part 16b located at a more lower side than the second bent section 42 in each of the lower members 16 extends linearly in the up-down direction. The second bent section 42 is located at a more upper side than an upper end 36a of a coupling plate 36 (see FIG. 4).

Each of the lower members 16 is located at the vehicle front side of each of the upper members 14, and is composed of a hollow pipe member. The vehicle front side end part 16b of the lower member 16 is supported at three points through a mounting bracket 34 and a gusset 38 to be described below.

Figure 5:
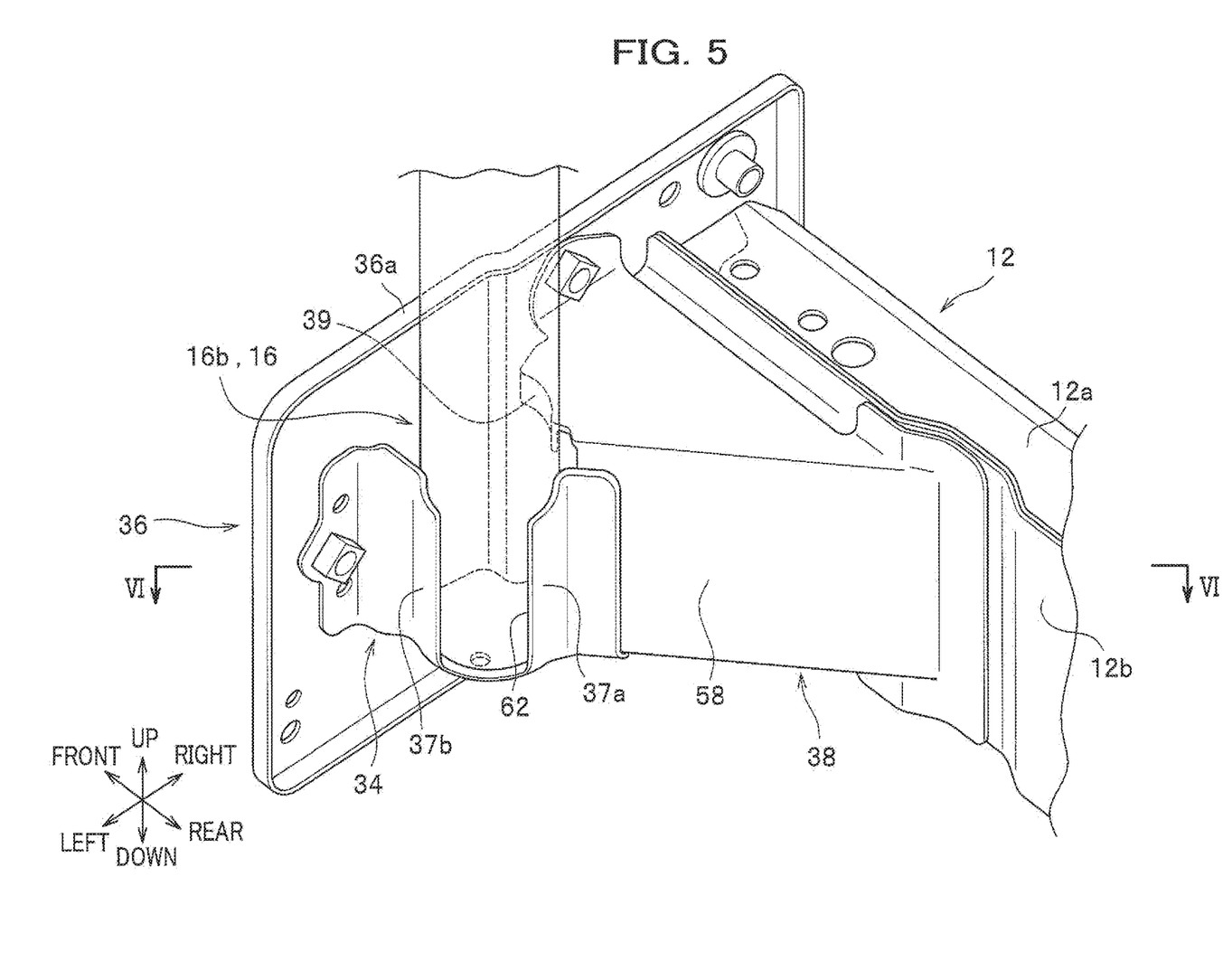
FIG. 5 is a perspective view showing a supporting state of a vehicle front side end part of the left lower member.
Figure 6:
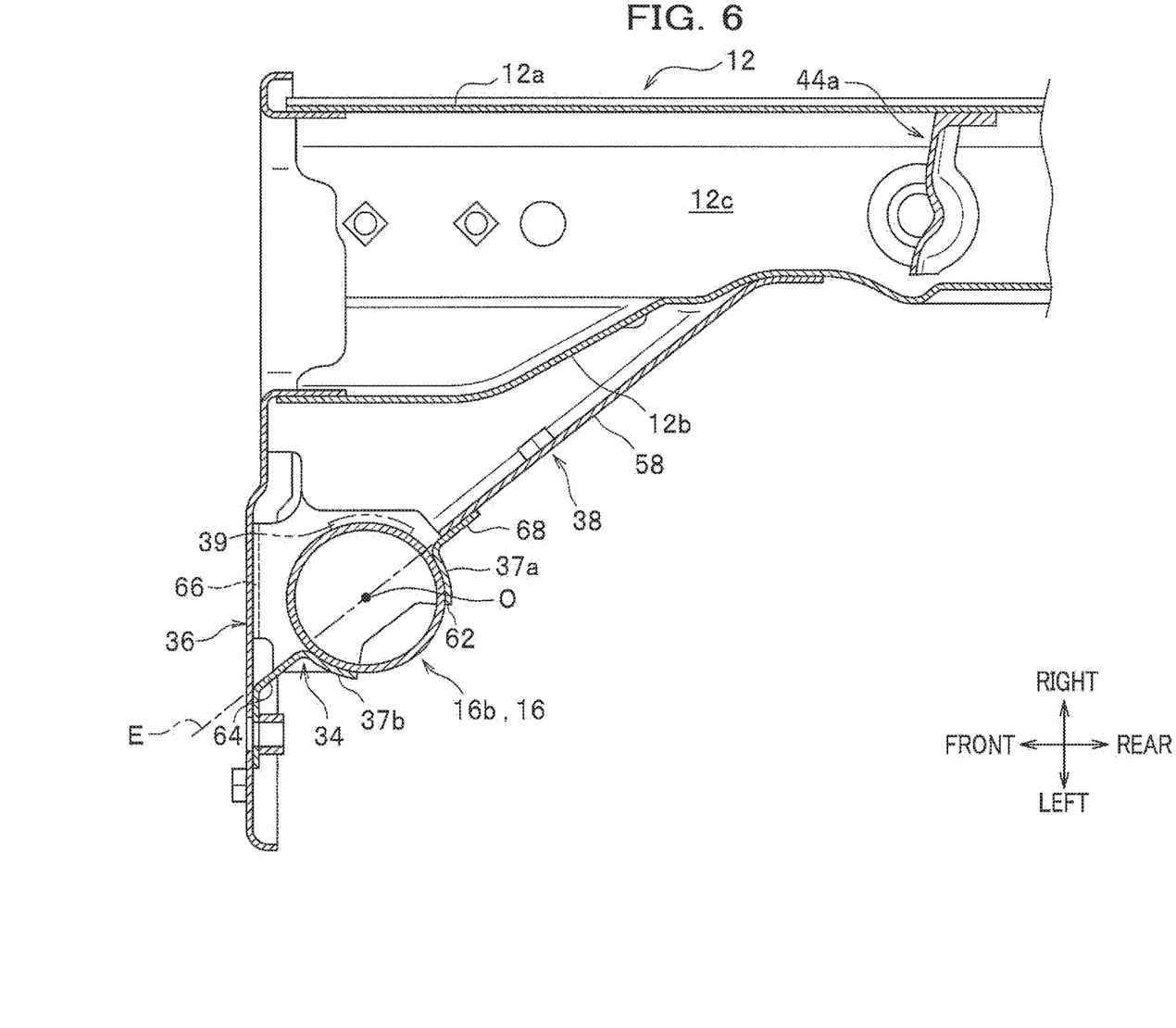
FIG. 6 is a cross sectional view taken along line VI-VI in FIG. 5.

More specifically, as shown in FIG. 5 and FIG. 6, the vehicle front side end part 16b of the lower member 16 is supported at three points composed of a pair of supporting walls 37a, 37b provided on the mounting bracket 34 and a supporting part 39 provided on the gusset 38. The pair of supporting walls 37a, 37b are disposed across a slit 62 formed on the mounting bracket 34, provided to stand upward from a bottom part of the mounting bracket 34, and formed to surround a part of the outer peripheral surface of the vehicle front side end part 16b. The supporting part 39 is disposed on the outer side in the vehicle width direction at an upper end part of the gusset 38.

As described above, the vehicle rear side end part 16a of the lower member 16 is coupled via the pair of bulkhead mounting metal fittings 28a, 28b to the front parts (the upper member body 22 and the upper inner member 24) of the upper member 14 (see FIG. 4).

As shown in FIG. 4, a pair of bulkhead metal fittings (second bulkheads) 44a, 44b, spaced apart from each other by a predetermined space in the vehicle front-rear direction, are disposed in the space part 12c in the vehicle front side end part of each of the front side frames 12, close to the corresponding gusset 38. The pair of bulkhead metal fittings 44a, 44b is joined via flange parts to the inner surface of the inner side frame 12a.

The pair of bulkhead mounting metal fittings 28a, 28b provided in the space part 26 of the upper member 14, and the pair of bulkhead metal fittings 44a, 44b provided in the space part 12c of the front side frame 12, are disposed at locations where they are overlapped each other in the up-down direction.

The coupling plate (coupling member) 36, the gusset 38, and the mounting bracket 34 are disposed at the vehicle front side end part of each of the front side frames 12, and on the outer side in the vehicle width direction of the vehicle front side end part, respectively.

The coupling plate 36 has a nearly rectangular shape in front view and is joined via a flange part thereof to the vehicle front side end part of the front side frame 12. Moreover, the coupling plate 36 extends from the vehicle front side end part outward in the vehicle width direction nearly orthogonal to the axial direction of the front side frame 12. A bumper beam 50 is coupled via an extension 48 of the front bumper mechanism 20 to be described below, to an outer part in the vehicle width direction on the vehicle front side of the coupling plate 36. Moreover, a coupling body 52 is coupled to an inner part in the vehicle width direction on the vehicle front side of the coupling plate 36. The coupling body 52 is coupled to a side stay 56 of the front bulk head 18.

The gusset 38 has a nearly triangular shape in planar view and is formed into a channel shape in section view. The gusset 38 is disposed in a corner section at which the vehicle front side end part of the front side frame 12 and the coupling plate 36 are nearly orthogonal to each other. Moreover, the gusset 38 includes an inclined part 58 that is inclined to get closer to the front side frame 12 as going toward the vehicle rear side in planar view. The front wall on the vehicle front side of the gusset 38 is fastened to the coupling plate 36 with bolts and nuts. The vehicle front side end part 16b of each of the lower members 16 is located on an extended line E of the inclined part 58.

The mounting bracket 34 is formed with the slit 62 that extends along the axial direction of the vehicle front side end part 16b of the lower member 16. Through the slit 62, a part of the vehicle front side end part 16b of the lower member 16 is exposed to the outside.

Moreover, the mounting bracket 34 has a plurality of flange parts. The plurality of flange parts includes a fastening flange part 64 that is fastened to the coupling plate 36 with bolts and nuts, a joining flange part 66 that is joined to the coupling plate 36 with bolts and nuts, and a joining flange part 68 that is joined to the inclined part 58 of the gusset 38 with bolts and nuts. A part on the inner side in the vehicle width direction of the fastening flange part 64, and the joining flange part 68 joined to the inclined part 58 of the gusset 38, each function as "a flange part", and are provided to extend along the inclined surface of the inclined part 58.

The front bulk head 18 is disposed at the front end part of the vehicle. The front bulk head 18 is composed of a pair of right and left side stays 56, 56, an upper bulk member 70, and a lower bulk member 72. The pair of right and left side stays 56, 56 is disposed near the vehicle front side end parts of the pair of right and left front side frames 12, 12 and nearly in parallel with each other in the vertical and up-down direction, respectively.

The upper bulk member 70 is bridged between upper end parts of the pair of right and left side stays 56, 56 in the vehicle width direction. The upper bulk member 70 is configured to allow a cross section thereof orthogonal to the axial direction to have a closed cross section of a nearly rectangular shape. The lower bulk member 72 is bridged between the lower end parts of the pair of right and left side stays 56, 56 in the vehicle width direction. The lower bulk member 72 is located nearly below the upper bulk member 70 in the vertical and up-down direction.

The front bumper mechanism 20 is composed of the bumper beam 50, and a pair of right and left extensions 48, 48. The bumper beam 50 is located at the vehicle front side of the vehicle front side end part 16b of each of the lower members 16 and the coupling plate 36, and extends in the vehicle width direction. The pair of right and left extensions 48 is coupled to the vehicle rear side of both end parts in the vehicle width direction of the bumper beam 50. Each of the extensions 48 is disposed bisymmetrically and has a nearly box-shaped configuration composed of a front wall, a rear wall, and side walls connecting the front wall and the rear wall with each other.

As shown in FIG. 1, a pair of right and left damper housings 74, 74 each housing a damper (not shown) therein is provided above the vehicle rear side end part of each of the front side frames 12. Provided on upper parts of the damper housings 74 is a pair of right and left damper bases 76, 76 each supporting the corresponding damper (not shown) thereon.

The damper housing 74 is disposed between the corresponding upper member 14 and the corresponding front side frame 12 along the vehicle width direction. The damper housing 74 is fixed via a plurality of side flange parts to a lower surface of the upper inner member 24, an outer side wall of the front side frame 12 (outer side frame 12b), and a dashboard upper 77, respectively.

As shown in FIG. 4, a belt-shaped coupling plate (another coupling member) 78 is provided to be bent along the shape of the damper housing 74, at a location where the pair of bulkhead mounting metal fittings 28a, 28b provided in the space part 26 of the upper member 14, and the pair of bulkhead metal fittings 44a, 44b provided in the space part 12c of the front side frame 12, are overlapped each other in the up-down direction.

The coupling plate 78 is adapted to couple the upper member 14 and the front side frame 12 with each other. The coupling plate 78 is disposed on a vehicle front side end part of the damper housing 74 and formed to extend along the vehicle width direction. Moreover, the coupling plate 78 has a reinforcing bead 80 provided to extend along a longitudinal direction thereof. The reinforcing bead 80 is formed by a linear recessed part which is recessed in a direction away from the damper housing 74. Note that, although the coupling plate 78 and the damper housing 74 are configured separately from each other in the present embodiment, the form of configuration is not limited to this embodiment. The coupling plate 78 and the damper housing 74 may be configured integrally with each other.

The vehicle body front part 10 according to the present embodiment is basically configured as described above, and operation and effects caused thereby will be described below.

The vehicle body front part 10 according to the present embodiment allows the vehicle front side end part 16b located at a more lower side than the second bent section 42 in each of the lower members 16 to extend linearly in the up-down direction (see FIG. 3 and FIG. 4). This makes it possible for the vehicle body front part 10 according to the present embodiment to inhibit the vehicle front part from increasing in dimension to promote downsizing of the vehicle.

Moreover, the vehicle body front part 10 according to the present embodiment allows the vehicle front side end part 16b of each of the lower members 16 to extend linearly in the up-down direction, thereby allowing the vehicle front side end part 16b of the lower member 16, when a collision load F (see FIG. 2) is input from the front side of the vehicle, to be displaced to the rear side of the vehicle by the collision load F transmitted through the bumper beam 50 and the extensions 48, and thus to abut on the tire T (see FIG. 1). Consequently, the vehicle body front part 10 according to the present embodiment makes it possible to transmit the collision load F input from the front side of the vehicle, to the tire T (see FIG. 1).

Moreover, the vehicle body front part 10 according to the present embodiment allows the lower member 16 to be provided with the first bent section 40 and the second bent section 42, thereby making it possible to allow the lower member 16 to be bent inward in the vehicle width direction. Consequently, the vehicle body front part 10 according to the present embodiment makes it possible to inhibit the vehicle front part from increasing in dimension.

Furthermore, the vehicle body front part 10 according to the present embodiment allows the dimension from the second bent section 42 to the vehicle front side end part 16b of the lower member 16 to be larger than the dimension (height dimension of the coupling plate 36) from the lower end to the upper end 36a of the coupling plate 36 (see FIG. 4), thereby allowing the lower member 16, when the collision load F is input from the front side of the vehicle, to be deformed (displaced) integrally with the coupling plate 36 so as to be folded in the front-rear direction of the vehicle. Consequently, the vehicle body front part 10 according to the present embodiment makes it possible to smoothly transmit the collision load F to the front side frame 12 side without inhibiting transmission of the collision load F to the front side frame 12 side.

In addition, as shown in FIG. 6, the vehicle body front part 10 according to the present embodiment allows the lower member 16 to be disposed on the extended line E of the inclined part 58 of the gusset 38 for alignment of the inclined part 58 of the gusset with the lower member 16, thereby making it possible to efficiently transmit the collision load F input from the front side of the vehicle, to the front side frame 12 via the lower member 16. More preferably, the center O of a circle in cross section of the lower member 16 is allowed to coincide with the extended line E of the inclined part 58 of the gusset 38 (see FIG. 6), thereby making it possible to allow the lower member 16 being a hollow member to be crushed and deformed by the collision load F to absorb the collision load F.

Furthermore, the vehicle body front part 10 according to the present embodiment allows a part of the fastening flange part 64 and the joining flange part 68 of the mounting bracket 34 to be provided on the extended line E of the inclined part 58 of the gusset 38, thereby making it possible to more efficiently transmit the collision load F input from the front side of the vehicle, to the front side frame 12.

In addition, as shown in FIG. 4, the vehicle body front part 10 according to the present embodiment allows the pair of bulkhead mounting metal fittings 28a, 28b provided in the space part 26 of the upper member 14, and the pair of bulkhead metal fittings 44a, 44b provided in the space part 12c of the front side frame 12, to be connected by the coupling plate 78 that is provided along the vehicle width direction on the vehicle front side end part of the damper housing 74. This makes it possible for the vehicle body front part 10 according to the present embodiment to enhance the strength of coupling between the upper member 14 and the front side frame 12. Consequently, the vehicle body front part 10 according to the present embodiment makes it possible to suppress torsion of the vehicle body front part 10 to improve rigidity and strength of the vehicle body front part 10.

Note that, although in the present embodiment, the pair of bulkhead mounting metal fittings 28a, 28b and the pair of bulkhead metal fittings 44a, 44b are disposed, respectively, a single bulkhead mounting metal fitting and a single bulkhead metal fitting may be provided, respectively.

Although the embodiment of the present invention has been described and illustrated in detail, the disclosed embodiment is made for purposes of illustration and example only and not limitation. The scope of the present invention should be interpreted by terms of the appended claims.

DESCRIPTION OF REFERENCE SIGNS

10: Vehicle body front part; 12: Front side frame; 14: Upper member; 16: Lower member; 16a: Vehicle rear side end part (of the lower member); 16b: Vehicle front side end part (of the lower member); 20: Front bumper mechanism; 28a, 28b: Bulkhead mounting metal fitting (First bulkhead); 34: Mounting bracket; 36: Coupling plate (Coupling member); 38: Gusset; 40: First bent section; 42: Second bent section; 44a, 44b: Bulkhead metal fitting (Second bulkhead); 58: Inclined part; 64: Fastening flange part (Flange part); 68: Joining flange part (Flange part); 78: Coupling plate (Another coupling member)

What is claimed is:

1. A vehicle body front part structure comprising:
a pair of right and left front side frames each extending in a vehicle front-rear direction;
a pair of right and left upper members each extending in the vehicle front-rear direction at respective outer sides in a vehicle width direction of the pair of right and left front side frames;
a pair of right and left lower members each located at a vehicle front side of each of the upper members and each allowing a vehicle front side end part thereof to be coupled to each of the front side frames; and
a coupling member provided on a vehicle front side end part of each of the front side frames and coupled to a front bumper mechanism,
wherein
each of the lower members is composed of a pipe member, and the vehicle front side end part of each of the lower members extends in an up-down direction,
each of the lower members includes a first bent section that is bent inward in the vehicle width direction from a vehicle rear side end part of each of the lower members, and a second bent section that is located nearer the vehicle front side than the first bent section and bent downward, and the second bent section is located at a more upper side than the coupling member, and
the vehicle body front part structure further comprises:
a first bulkhead adapted to fix the vehicle rear side end part of each of the lower members to each of the upper members;
a second bulkhead disposed in each of the front side frames so as to overlap the first bulkhead in the up-down direction in side view; and
another coupling member disposed at a location where the first bulkhead and the second bulkhead overlap each other in the up-down direction in side view.

2. The vehicle body front part structure according to claim 1, further comprising
a gusset coupled to the outer side in the vehicle width direction of a vehicle front side end part of each of the front side frames, wherein
the gusset includes an inclined part inclined so as to get closer to each of the front side frames as going toward a vehicle rear side in planar view, and
the vehicle front side end part of each of the lower members is located on an extended line of the inclined part.

3. The vehicle body front part structure according to claim 2, further comprising
a mounting bracket adapted to mount the vehicle front side end part of each of the lower members on each of the front side frames, wherein
the mounting bracket includes a flange part, and
the flange part is provided to extend along the inclined part.

* * * * *